United States Patent [19]

Van Acker

[11] 3,715,739

[45] Feb. 6, 1973

[54] DATA PROCESSING CASSETTE AND SPINDLE

[75] Inventor: Paul Antonius Ferdinand Van Acker, Rijswijk, Netherlands

[73] Assignee: U.S. Philips Corporation, New York, N.Y.

[22] Filed: Sept. 10, 1971

[21] Appl. No.: 179,462

[30] Foreign Application Priority Data

Sept. 24, 1970 Netherlands....................7014068

[52] U.S. Cl......340/174.1 C, 179/100.2 Z, 206/62 P, 274/41.4, 346/137

[51] Int. Cl...............................................G11b 23/04

[58] Field of Search...346/74 MD, 137; 340/174.1 C; 274/41.4; 179/100.2 Z; 206/62 P

[56] References Cited

UNITED STATES PATENTS

| | | | |
|---|---|---|---|
| 3,526,884 | 9/1970 | Buslik et al. | 340/174.1 C |
| 3,643,240 | 2/1972 | Raiser | 206/62 P |
| 3,635,608 | 1/1972 | Crouch et al. | 179/100.2 Z |

*Primary Examiner*—Vincent P. Canney
*Attorney*—Frank R. Trifari

[57] ABSTRACT

A cassette for use in a data processing apparatus, which cassette contains a magnetizable recording disc which is supported by a support provided with a central bore by means of which the cassette may be placed on the driving spindle of the apparatus. The cassette is provided with a clamping device in the form of a collet by means of which the cassette may be clamped and which is adapted to be operated by a handle hingedly connected to the cassette.

9 Claims, 4 Drawing Figures

Figure 1:
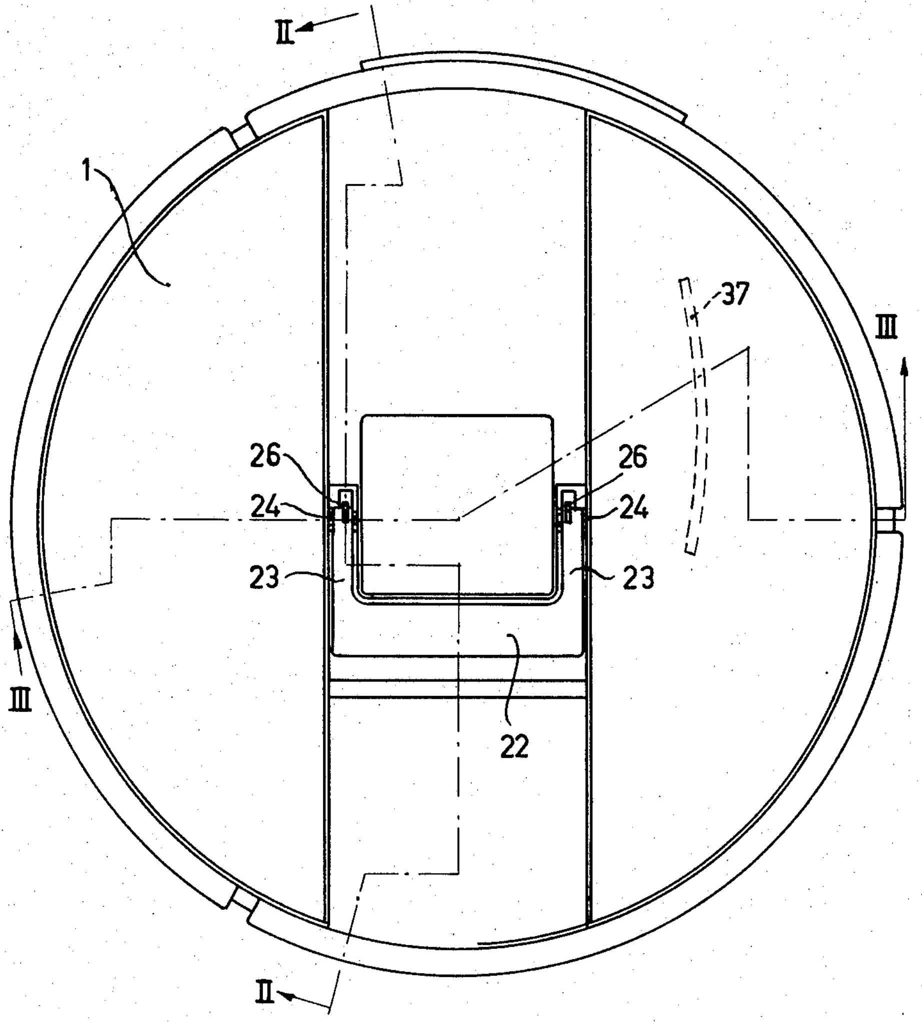

*INVENTOR.*
PAUL ANTONIUS FERDINAND VAN ACKER
*BY* Frank R. Trifari
Agent

*INVENTOR.*

PAUL ANTONIUS FERDINAND VAN ACKER

*BY* Frank R. Trifari

Agent

INVENTOR.
PAUL ANTONIUS FERDINAND VAN ACKER
BY
Agent

DATA PROCESSING CASSETTE AND SPINDLE

The invention relates to a cassette for use in an apparatus for processing data in the form of magnetic recordings. The cassette comprises a cover, a bottom and a side-wall within which is arranged at least one recording disc which is provided with a magnetizable material and is carried by a support which has a central bore by means of which it may be placed on a driving spindle of the apparatus. The cassette further comprises a clamping device by means of which the support may be clamped onto the driving spindle. An operating lever is pivotally arranged on the cover, and means are provided which, under the influence of a pivotal movement of this lever, can operate the clamping device.

A cassette of this type is known in which the supporting element of the recording disc is provided with a magnet ring by means of which the cassette is clamped when placed on the driving spindle of the apparatus. The pivoting operating lever, which is in the form of a carrying handle, is movable between two positions, namely a first position, the rest position, in which it is folded into a recess in the cover, and a second position, the carrying position, in which the handle extends substantially at right angles to the cover. The handle is provided with a manually operable bolt which when being displaced coupled the means capable of operating the magnet ring to the handle. In the storage position of the cassette a detachable base plate having projecting edges surrounds the bottom and the side-walls of the cassette so as to close openings which are provided in the side-walls and through which, in the operative position of the cassette, magnetic heads and brushes may have access to the interior of the cassette. This detachable base plate is maintained attracted to the bottom by means of magnet elements arranged in the base plate which co-operate with the magnet ring of the disc-supporting element. When the cassette is to be placed on the driving spindle of the apparatus, the magnet ring is pulled off from the base plate by means of the handle on movement of the handle from the first, folded position to the second, vertical position, after the bolt on the handle has been operated and the means for operating the magnet ring have been coupled to the handle. When the cassette is in position on the driving spindle of the apparatus and is to be disconnected from it, this may be effected by pivoting the handle from the first, folded position to the second, vertical position, after the bolt on the handle has again been operated by hand, enabling the magnet ring to be pulled off from the co-operating magnet provided on the driving spindle and to be disconnected, so that the cassette can be removed.

The provision of the additional manually operable bolt on the handle renders handling of the cassette comparatively complicated. Moreover, the detachable base plate which is used to close the openings in the side-walls of the cassette forms a component which is loose in the operative condition of the cassette and, although in operation it may be placed on the cassette in inverted position, provides difficulty.

It is an object of the present invention to obviate the said disadvantages and for this purpose a cassette according to the invention is characterized in that the clamping device takes the form of a collet which extends in the bore of the support and is axially movable in this bore. In a first position of the lever, substantially at right angles to the cover, the collet is in a retracted position in the bore under the influence of spring force and, when the lever is pivoted to a second and to a third position respectively, it is movable from this retracted position against the spring force to an extended position and beyond this position respectively.

The present invention permits the cassette to be fixed in position and to be detached merely by pivoting movements of the handle, without the need of additional means to be previously operated by hand.

A suitable embodiment of the invention consists in that the operating lever has at least two cam elements which are rotatable in planes at right angles to the pivot axis of the lever and extend through radially different distances relative to the pivot axis on both sides of a longitudinal axis of the lever, which longitudinal axis is at right angles to the pivot axis. As a result, on pivotal movement of the lever to the second position one projection will cause the collect to move to the extended position, while on the lever being pivoted to the third position the collet moves beyond the extended position. Preferably the operating lever is in the form of a U-shaped handle, the limbs of the U being hingedly connected to the cover of the cassette and each being provided with the said two cam elements.

A preferred embodiment of the invention consists in that a hat-shaped element is provided which comprises a bottom portion, a sidewall portion and a rim portion, the collet being secured to the bottom portion. The disc support is provided with a sleeve disposed concentrically with respect to the bore of the support for guiding the side-wall portion of the hat-shaped element. A compression spring is arranged between the bottom portion of the hat and an end face of the sleeve, and two studs are provided which are axially displaceably guided in recesses formed in the cover of the cassette and each protrude through openings in the cover so as to bear against the rim portion of the hat and at the opposite end are maintained in engagement with the limbs of the U-shaped handle under the influence of a spring force so as to be operable by the projections on the limbs during pivotal movement of the handle.

According to the invention, the cover, the bottom and the sidewall of the cassette are rigidly interconnected and an opening is provided in the sidewall of the cassette which is closed by a plate-shaped element which is peripherally displaceably guided in rebates formed in the cover and the bottom and seals against the rebate walls by its resilience. An additional base plate with vertical edges is therefore no longer needed.

The invention also relates to a driving spindle suitable for co-operating with a cassette according to the invention. In accordance with the invention, this driving spindle is characterized in that in one of its ends a first sleeve is axially arranged which is provided with at least one bore in the shape of a truncated cone. The cone largest diameter of the cone is disposed towards the spindle end, whilst behind an end-face of this sleeve remote from the spindle end there is provided a chamber in which a second sleeve is axially displaceably guided. The displacement of the second sleeve is limited in one direction by the said end face of the first sleeve and in the other direction by a radially extending wall portion of the chamber. The second sleeve has a bore the diameter of which is substantially equal to the smallest diameter of the conical bore of the first sleeve.

Figures 2, 3:
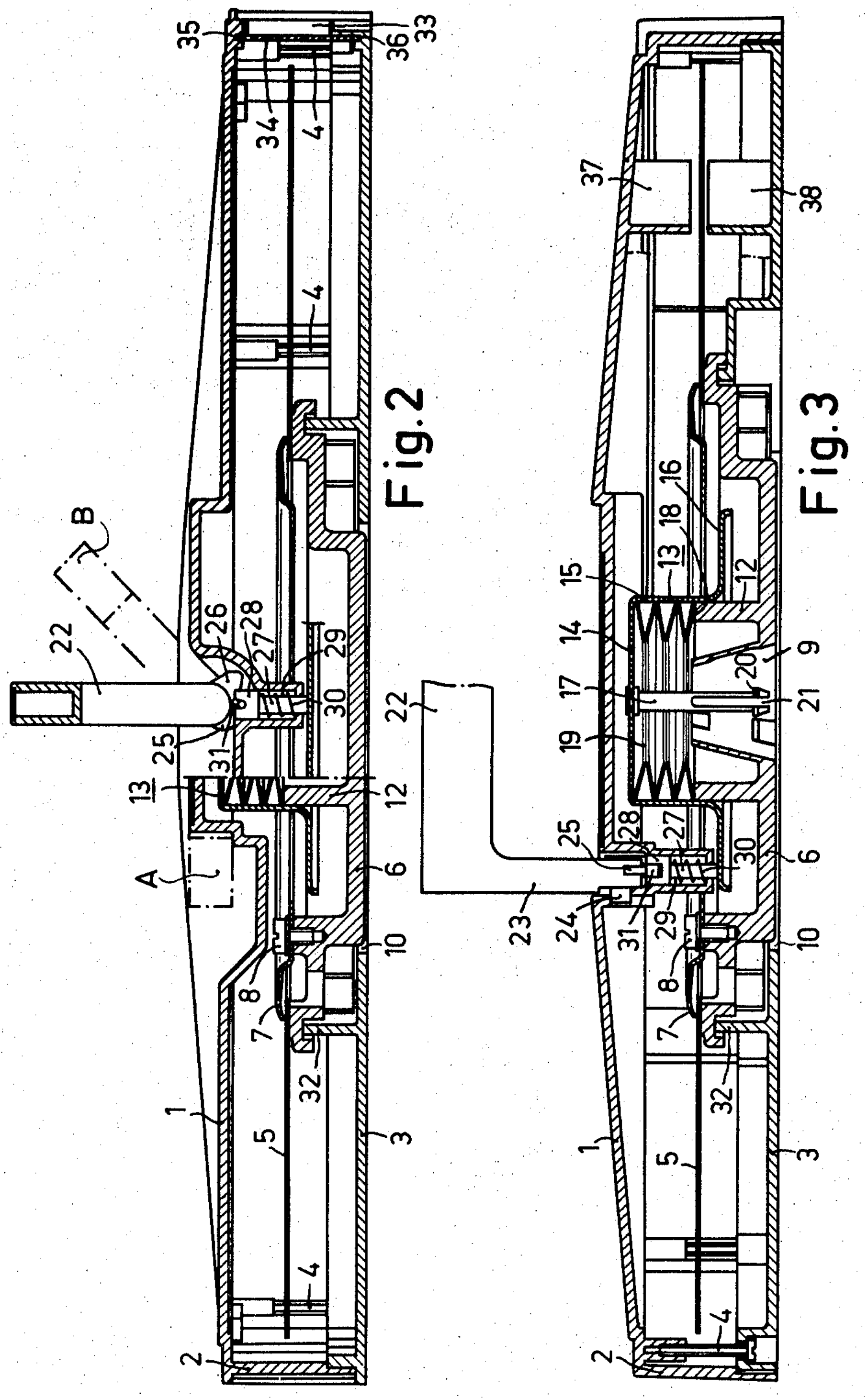
Figure 4:
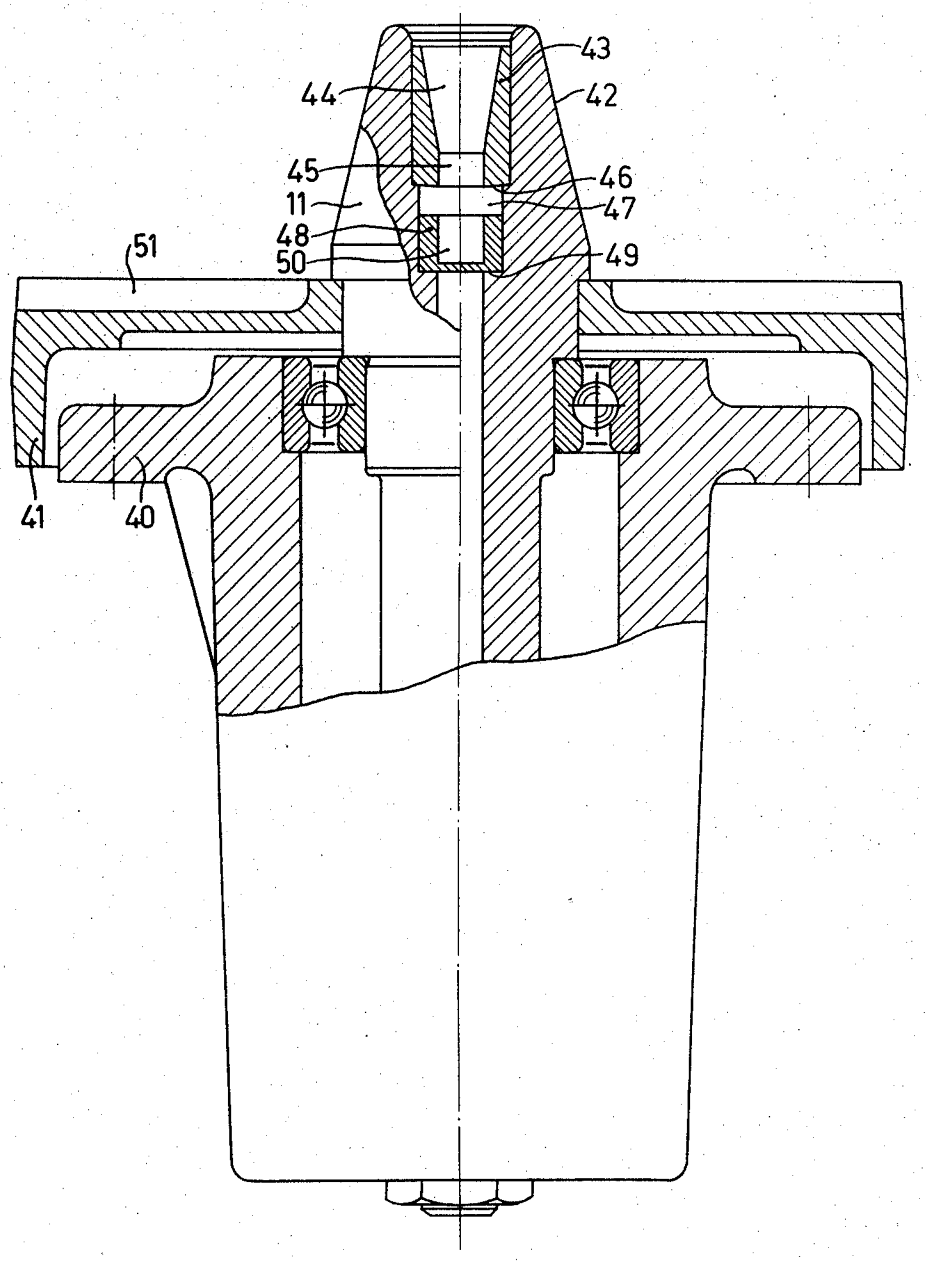

An embodiment of the invention will now be described, by way of example, with reference to the accompanying diagrammatic drawings, in which FIG. 1 is a top plan view of a cassette according to the invention, FIG. 2 is a sectional view taken on the line II—II of FIG. 1, FIG. 3 is a sectional view taken on the line III—III of FIG. 1, and FIG. 4 is a part elevation, part longitudinal sectional view on an enlarged scale of a driving spindle for co-operating with a cassette as shown in FIGS. 1 to 3.

The cassette according to the invention is intended for use in an apparatus for processing data in the form of magnetic recordings. As shown in the drawing, the cassette comprises a cover 1, a sidewall 2 integral with the cover, and a bottom 3 secured to the cover by screws 4. The cassette contains a recording disc 5 which is coated with a magnetizable material and is supported by a support 6 and is clamped to the support by means of a clamping ring 7 and bolts 8. The support 6 has a central conical bore 9 which is disposed opposite an opening 10 in the bottom 3 and by means of which the entire cassette may be placed on a driving spindle 11 shown in FIG. 4, as will be described in greater detail hereinafter.

The support 6 is provided with a sleeve 12 which extends inwardly, is disposed concentrically about the bore 9 and serves to guide a hat-shaped element 13 which comprises a bottom portion 14, a sidewall portion 15 and a rim portion 16. To the bottom portion 14 of the hat 13 there is secured a collet 17, which extends in the bore 9 of the support 6 and is axially movable in this bore in a manner described more fully hereinafter. A compression spring 19 is interposed between the bottom portion 14 of the hat and an end-face 18 of the sleeve 12.

At the end more remote from the hat the collet 17 has a thickened head 20 which has a conical outer surface, the smallest diameter of the cone being disposed towards the bottom of the cassette. The head end of the collet is hollow and provided with several, for example four, equally spaced saw-cuts 21, so that the remaining parts of the collet end are slightly resilient.

A U-shaped handle 22 is provided the limbs 23 of which are hingedly secured to the cover 1 of the cassette by means of the journals 24. Each limb 23 is formed with two camlike elements 25 and 26, which are rotatable in planes at right angles to the pivot axis formed by the journals 24, the cams 26 extending radially from the pivot axis by a larger distance than do the cams 25. The cam elements 25 and 26 extend on either side of the longitudinal axis of the respective limb of the lever at right angles to the pivot axis. The elements 25 and 26 co-operate with a stud 27 for operating the hat 13 and the collet 17 secured thereto. For this purpose, the stud 27 is provided with a head 28 which is slidably guided in a recess 29 in the cover. A compression spring 30 is interposed between the bottom of the recess 29 and the head 28 of the stud 27. The stud end opposite to the head protrudes through an opening in the recess and bears against the rim 16 of the hat 13. A roller 31 is rotatably mounted in the stud head 28 and is adapted to co-operate with the cam elements 25 and 26 of the handle.

In order to render the recording disc 5 accessible to the magnetic heads and brushes of the apparatus in the operative condition of the cassette, there is formed in the side-wall 2 of the cassette an opening 33 (FIG. 2), which in the non-operative position of the cassette is closed by a slide 34. The slide 34 takes the form of a plate-shaped element which is peripherally displaceably guided in rebates 35 and 36 made in the cover 1 and the bottom 3 and seals against these rebates under the influence of its own externally directed resilience. When the cassette is in position on the driving spindle of the apparatus, the slide 34 may be opened by means, now shown, which are provided in the apparatus, after which the magnetic heads and brushes may be inserted into the cassette through the opening 33.

To ensure satisfactory air circulation in the cassette the cover and the bottom of the cassette are provided at their inner surfaces with air guide vanes 37 and 38 respectively.

FIG. 4 shows a driving unit suitable for co-operating with a cassette as shown in FIGS. 1 to 3. The driving spindle 11 is rotatably supported in a frame 40 and carries a pulley 41 by means of which it can be driven by a drive motor, not shown. The head end 42 of the spindle is conical so as to fit in the conical bore 9 of the support 6 provided in the cassette. There is arranged in the head end a sleeve 43 which is provided with a bore 44 in the shape of a truncated cone and with a cylindrical bore 45 which immediately adjoins the signal diameter of the cone, the largest diameter of the conical bore 44 being disposed towards the head end of the spindle. Behind an end face 46 of the sleeve 43, which end face is remote from the head end, there is a chamber 47 in which a second sleeve 48 is axially displaceably guided. The displacement of the sleeve 48 is limited in one direction by the end face 46 of the sleeve 43 and in the other direction by a radially extending wall portion 49 of the chamber 47. The second sleeve is provided with a bore 50 the diameter of which is substantially equal to the diameter of the cylindrical bore 45 of the first sleeve 43.

The pulley 41 is provided with fan blades 51 which ensure that when the cassette is in position on the spindle the space within the cassette is maintained at a relative excess pressure, thus preventing the penetration of dust. This arrangement dispenses with the need for a special dust seal at the location of the spindle.

Coupling the cassette to the driving spindle and disconnecting it therefrom are effected as follows:

In the position of the cassette shown in FIGS. 2 and 3, the handle 23 is in a vertical position, which determines the carrying position of the cassette, the collet 17 being in its retracted position in the bore 9. The support 6 for the recording disc 5 is urged against a rim 32 of the cassette bottom under the combined action of the springs 19 and 30, so that the disc is locked against rotation and also a dust-tight seal is ensured. In this position the cassette is placed on the driving spindle 11. The cassette is clamped to the spindle 11 by pivoting the handle 23 through substantially 90° into the position A which is shown by dot-dash-lines in FIG. 2. During this pivotal movement of the handle into the position A the cam elements 25 of the limbs of the handle will depress the stud 27 so that the collet is moved against the spring force to an extended position in which the resilient portions of the conical head 20 of the collet by their movement along the wall of the conical bore 44 of the sleeve 43 in the driving spindle are initially urged inwards, then in the stressed condition pass through the cylindrical bore 45 and on reaching the end face 46 deflect outwards under the influence of their resilience. The head 20 of the collect is maintained in engagement with the end face 46 of the sleeve 43 under the influence of the forces of the springs 19 and 30, which also ensure that the support 6 together with the recording disc 5 is slightly lifted from the rim 32 of the cassette bottom, so that the recording disc 5 becomes rotatable and the operative condition is obtained.

To remove the cassette from the driving spindle the handle 22 is pivoted from the operative position A shown in FIG. 2, beyond the vertical position to a disconnected position B, during which pivotal movement the studs 27 are operated by the cam elements 26 and are depressed through a larger distance than when they are operated by the cams 25. The conical head 20 of the collet slides into the cylindrical bore 50 of the second sleeve 48 of the driving spindle and securely clamps itself in this sleeve. When the handle is returned from the position B to the vertical position, the collet is released, its head 20 initially carrying along the second displaceable sleeve 48, until this sleeve abuts the end face 46 of the first sleeve 43 and is left behind, whereupon the collet can freely move upwards through the bore in the first sleeve to re-assume the retracted position shown in the drawing, after which the cassette may be taken from the spindle by means of the handle.

What is claimed is:

1. A cassette for use in an apparatus for processing data in the form of magnetic recordings, which cassette comprises a cover, a bottom and a side-wall within which is arranged at least one recording disc which is provided with a magnetizable material and is carried by a support which has a central bore by means of which it may be placed on a driving spindle of the apparatus, the cassette further comprising a clamping device by means of which the support may be clamped onto the driving spindle, an operating lever pivotally arranged on the cover, and means which under the influence of a pivotal movement of this lever can operate the clamping device, characterized in that the clamping device takes the form of a collet which extends in the bore of the support and is axially movable in this bore and, in a first position of the lever substantially at right angles to the cover, is in a retracted position in the bore under the influence of spring force and, when the lever is pivoted to a second and to a third position respectively, is movable from this retracted position against the spring force to an extended position and beyond this position respectively.

2. A cassette as claimed in claim 1, characterized in that the operating lever has at least two cam elements which are rotatable in planes at right angles to the pivot axis of the lever and extend through radially different distances relative to the pivot axis on either side of the longitudinal axis of the lever, which longitudinal axis is at right angles to the pivot axis.

3. A cassette as claimed in claim 2, characterized in that the operating lever takes the form of a U-shaped handle, the limbs of the U being hingedly connected to the cover of the cassette and each being provided with the said two cam elements.

4. A cassette as claimed in claim 3, characterized in that a hat-shaped element is provided which has a bottom portion, a sidewall portion and a rim portion, the collet being secured to the bottom portion, whilst the disc support is provided with a sleeve disposed concentrically with respect to the bore of the support and for guiding the sidewall portion of the hat-shaped element, a compression spring being arranged between the bottom portion of the hat and an end face of the sleeve, whilst two studs are provided which are axially displaceably guided in recesses formed in the cover of the cassette and each protrude through openings in the cover so as to bear against the rim portion of the hat and at the opposite end are maintained in engagement with the limbs of the U-shaped handle under the action of a spring force so as to be operable by the projections on the limbs during pivotal movement of the handle.

5. A cassette as claimed in claim 1, characterized in that the cover, the bottom and the sidewall of the cassette are rigidly interconnected and an opening is provided in the sidewall of the cassette which is closed by a plate-shaped element which is peripherally slidably guided in rebates made in the cover and in the bottom and which seals against the walls of the rebates under the influence of its own resilience.

6. A driving spindle suitable for co-operating with a cassette as claimed in claim 1, characterized in that in one of the spindle ends a first sleeve is axially arranged which is provided with at least one bore in the shape of a truncated cone, the largest diameter of the cone being disposed towards the spindle end, whilst behind an end face of this sleeve remote from the spindle end there is a chamber in which a second sleeve is axially displaceably guided, the displacement thereof being limited in one direction by the said end face of the first sleeve and in the other direction by a radially extending wall part of the chamber, the second sleeve having a bore the diameter of which is substantially equal to the smallest diameter of the conical bore of the first sleeve.

7. A data processing cassette for containing magnetic disc recordings comprising a cover, a bottom and a side wall, a support within said cassette for carrying said magnetic disc, a central bore provided in said support for placing said cassette on a driving spindle of a data processing apparatus, a clamping device for clamping the support onto said driving spindle, an operating lever pivotally arranged on the cover, means for operating the clamping device upon pivotal movement of said lever, said clamping device comprising a collet extending into and axially movable within said central bore, said collet being in a retracted position within said bore when said lever is in a first position which is substantially at right angles to the lever, said collet being movable against the bias of a spring means to an extended operable position and a releasable position beyond said extended operable position when said lever is moved to a second and third position respectively.

8. The cassette according to claim 7 further comprising two cams of radially different heights mounted for rotatable movement at the ends of said lever for causing said collet to be moved to said positions.

9. The cassette according to claim 7 further comprising a hat-shaped element having a bottom portion, a side wall portion and a rim portion, said collet being secured to the bottom portion of said hat-shaped element, a sleeve arranged concentrically with said central bore on said support for guiding the side wall portion of said hat-shaped element, a compression spring arranged between the bottom portion of said hat-shaped element and an end face of said sleeve, stud means axially displaceable in recesses in the cover of said cassette protruding through openings in said cover for engagement with said lever at one end thereof and against the rim portion of said hat-shaped element at the other end thereof, biasing means for maintaining said stud means in engagement with said lever so that upon pivotal movement of said lever said stud means will be caused to operatively move said hat-shaped element.

* * * * *